June 16, 1931.                H. WHITTLE                1,809,879
                CIRCUITS FOR ELECTROMAGNETIC DEVICES
                         Filed March 23, 1927
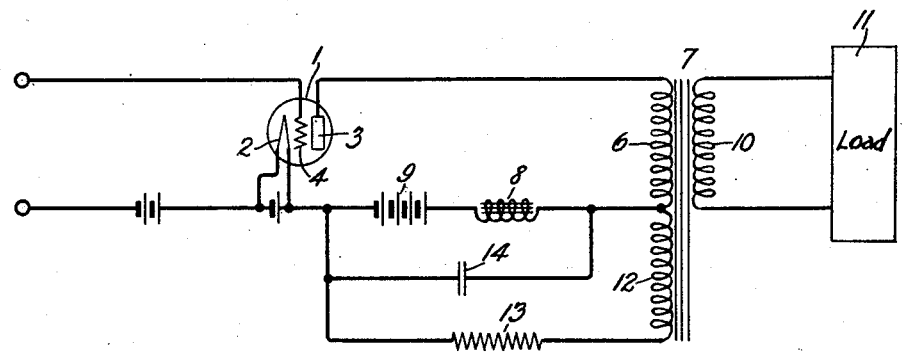
                                    INVENTOR
                                HORACE WHITTLE
                            BY
                                        ATTORNEY Patented June 16, 1931

1,809,879

UNITED STATES PATENT OFFICE

HORACE WHITTLE, OF MAPLEWOOD, NEW JERSEY, ASSIGNOR TO BELL TELEPHONE LABORATORIES, INCORPORATED, OF NEW YORK, N. Y., A CORPORATION OF NEW YORK

CIRCUITS FOR ELECTROMAGNETIC DEVICES

Application filed March 23, 1927. Serial No. 177,818.

This invention relates to circuits for electromagnetic devices and particularly to means for neutralizing steady flux in electromagnetic devices coupled to direct current circuits.

When employing a transformer for coupling circuits one of which carries direct current, it is common practice to pass this direct current as well as alternating current through one of the transformer windings. The flux set up in the transformer core due to the direct current flowing through a winding thereof is in many cases undesirable, especially in the case of cores which saturate at a low flux density, such as those made of certain nickel-iron alloys which are disclosed in Patent No. 1,586,884, granted to G. W. Elmen, June 1, 1926.

The present invention overcomes this disadvantage and is applicable not only to transformer circuits but to other electromagnetic systems. An important application is in output circuits of vacuum tube amplifiers. This application of the invention has been chosen to illustrate the invention and is described at length below. There is provided an output transformer having an auxiliary winding connected to the source of space current for setting up a magnetomotive force in the transformer core which opposes the magnetomotive force set up by the direct current flowing in the primary winding from this source and which, therefore, decreases the flux in the transformer core. When using a core of the nickel-iron alloy referred to above, it is preferable to have these magnetomotive forces substantially equal and opposite, thus reducing the steady flux in the core to zero or thereabout, so that high permeability in the core material is obtained, resulting in high mutual inductance in the transformer and therefore low phase distortion and high efficiency.

The invention may be fully understood by referring to the following description taken in connection with the accompanying drawing which is a diagrammatic showing of the embodiment of the invention mentioned just above.

Referring now to the drawing, the input circuit is connected between the grid or control electrode 4 and the cathode 2 of an electron discharge device or vacuum tube 1, while a winding 6 of transformer 7 is connected between the anode 3 and the cathode 2 through a choke coil 8 and a battery 9. Another transformer winding 10 is connected to a load 11. A third transformer winding 12, wound in the same direction as the winding 6, is connected to the battery 9 through the choke coil 8 and a resistance element 13. A condenser 14 is connected across the battery 9 and choke coil 8 so as to provide a low impedance path between the transformer winding 6 and the cathode 2.

In considering the operation of the device, it is seen that direct current flows from the positive terminal of battery 9 through choke coil 8, transformer winding 6 and thence from the anode 3 to cathode 2 of the vacuum tube 1, this cathode being connected to the negative terminal of battery 9. Direct current also flows from the positive terminal of battery 9 through choke coil 8, transformer winding 12, resistance element 13 and thence to the negative battery terminal. Since the windings 6 and 12 are in the same direction and the currents flow through these windings in opposite directions it is clear that the magnetomotive forces set up in the transformer core due to these two windings are opposed to each other. The ratio of the turns of windings 6 and 12 and the resistance of the element 13 may be made such that any desired flux flows in the core of transformer 7. When employing a core material such as a nickel-iron alloy which saturates at a low flux density, it is desirable to make the magnetomotive forces set up by the windings 6 and 12, respectively, approximately equal and opposite so that substantially no flux flows in the core. If the number of turns of windings 6 and 12 are equal, then, in order that the magnetomotive forces set up in the core of these windings may be equal and opposite, the resistance of element 13 should be equal to the internal resistance of the vacuum tube 1 measured between the anode 3 and the cathode 2. When the turns of winding 12 are less than those of winding 6, the resistance of element 13 must be decreased in order that the ampere turns of and, therefore, the magnetomotive forces set up by the windings 6 and 12, respectively, may be equal. It is apparent that as the turns of winding 12 are decreased, the alternating current efficiency of the transformer is increased, but the battery drain is simultaneously increased and vice versa. Since the anode current of most electron discharge devices is comparatively small, it is ordinarily desirable to make the turns of the winding 6 in the anode circuit two or three times as great as the turns in the auxiliary winding 12 so as to make the transmission loss due to the use of the auxiliary winding negligible. Where there is no necessity for preventing phase distortion in the transformer, a choke coil may be connected in series with the resistance 13 for the purpose of increasing the alternating current efficiency of the transformer.

While the invention has been described in connection with a transformer, it is apparent that there are numerous other applications therefor, for instance, telephone receivers, measuring instruments, and other electromagnetic devices. Moreover, the invention is not limited to a circuit employing an electron discharge device for supplying alternating current to the electromagnetic device, but is applicable to any circuit arrangement employing a device which is to be supplied with current from a direct current source as, for instance, a telephone transmitter. In some cases, as when employing an electromagnetic device having a magnetic circuit of a material other than the nickel-iron alloy referred to above, it may not be desirable to reduce the steady flux in the core substantially to zero, but advantage may be gained by controlling the value of the steady flux in accordance with the present invention so that high permeability or some other desired operating condition is obtained. A convenient method for indicating the amount of steady flux flowing in the transformer core is to connect the windings of a direct current differential ammeter in series with transformer windings 6 and 12, respectively.

What is claimed is:

1. A circuit comprising a transformer having a plurality of windings, a source of direct current connected to one of said windings, a vacuum tube in series with said source and said winding, a second winding connected in circuit with a source of direct current so that the magnetomotive forces set up by the currents flowing in said windings are opposed to each other, said last mentioned winding having substantially fewer turns than said one winding and a resistance connected to one of said windings for reducing the current flowing therein, and thereby altering the flux in the transformer core, so that the magnetomotive forces set up by the direct currents flowing in said windings substantially neutralize each other.

2. In combination, an electron discharge device having an anode and a cathode, means for impressing signals thereon, and an electromagnetic device having a plurality of windings, one of said windings forming a part of a circuit through which direct anode current and current variations representing said signal flow, and another winding for opposing the flux set up in the magnetic circuit of said electromagnetic device by the direct anode current, said last winding having substantially fewer turns than said one winding and included in a circuit containing only impedance which remains constant as regards signal variations and a direct current source as the only source of voltage external to said winding.

3. In combination, an electron discharge device having an anode, a cathode and a control electrode, a transformer, a source of direct current connected between said cathode and anode through one winding of said transformer, means for impressing signals on said winding, a second winding on said transformer having substantially fewer turns than said one winding and connected to a direct current source such that the magnetomotive force set up in the core of said transformer by said second mentioned winding is substantially equal and opposite to the magnetomotive force set up by the direct current flowing through said first mentioned winding, thereby reducing the direct current flux in said core substantially to zero, said second mentioned winding being included in a circuit containing only impedance which remains constant as regards signal variations and a direct current source as the only source of voltage external to said winding.

4. In combination, an electron discharge device having an anode, a cathode and a control electrode, a transformer having a plurality of windings, a source of direct current, the negative terminal of which is connected to said cathode and a positive terminal of which is connected to a common terminal of two of said transformer windings, the other terminal of one of said windings being connected to said anode and the other terminal of said second mentioned winding being connected to said negative battery terminal, said second mentioned winding having substantially fewer turns than said one winding.

5. In combination, an electron discharge device having an anode, a cathode and a control electrode, a transformer having a plurality of windings, a source of direct current, the negative terminal of which is connected to said cathode, and a positive terminal of which is connected to a common terminal of two of said transformer windings, the other terminal of one of said windings being connected to said anode and the other terminal of a second winding being connected to said negative battery terminal through a resistance element, said second winding having substantially fewer turns than said one winding, the resistance of said resistance element, the ratio of the turns of said transformer windings and the direction of the currents flowing in said windings being such that substantially no direct current flux flows in the core of said transformer.

6. A circuit comprising a transformer having a plurality of windings, one of said winding having a substantially greater number of turns than another of said windings, a core for said transformer, a source of direct current connected in circuit with said windings, means for impressing signal voltages on said one winding, and means for adjusting the direct current flow in one of said windings such that the current in one of said windings sets up a magnetomotive force in said core in one direction, and the current in another of said windings sets up a magnetomotive force in said core in the opposite direction and of a substantially equal amount.

7. A circuit comprising a vacuum tube, a resistance element, a source of direct current, and a transformer, said transformer having a core and a plurality of windings thereon, one portion of said circuit including said vacuum tube, said direct current source, and one of said windings having a certain number of turns, the current in said portion producing a certain magnetomotive force in said core in one direction, and a second portion of said circuit including said resistance, said direct current source and another of said windings having from one-half to one-third as many turns as said first winding, said resistance adjusting the current in said second portion to produce a magnetomotive force in said core in the opposite direction to substantially balance out said first mentioned magnetomotive force.

8. In a signal repeating system, a thermionic discharge device having at least three elements, means for impressing signal voltage variations on said discharge device, an inductance device comprising a core and a plurality of windings thereon, one of said windings connected to the output circuit of said discharge device, means for impressing a direct current potential on the anode of said discharge device through said one winding, and means for neutralizing, at least in part, the magnetomotive force produced in said core by the direct current through said one winding, said last mentioned means comprising another of said windings having substantially fewer turns than said one winding, a connection from one terminal of said other winding to one terminal of said one winding and a connection from the other terminal of said other winding to a potential which is negative with respect to the potential of the said one terminal of the said other winding.

9. In a signaling system, a line over which signal currents are transmitted, an electrical network connected to said line and having a direct current path, an inductance device comprising a core and a plurality of windings thereon, one of said windings connected through the direct current path of said network to a source of direct current, and means for substantially neutralizing the magnetomotive force produced in said core by direct current through said one winding, said last mentioned means comprising another of said windings having from one-half to one-third as many turns as said one winding, a connection from one terminal of said other winding to one terminal of said one winding, and a connection from the other terminal of said other winding to a potential which is negative with respect to the potential of the said one terminal of said other winding.

In witness whereof, I hereunto subscribe my name this 17th day of March A. D., 1927.

HORACE WHITTLE.